United States Patent
Rao et al.

(10) Patent No.: US 8,219,155 B2
(45) Date of Patent: Jul. 10, 2012

(54) METHOD AND APPARATUS FOR DETERMINING WHETHER A DEVICE IS SUITABLE FOR OPERATING AT AN INCIDENCE LOCATION

(75) Inventors: Jaya Rao, Kangar (MY); Abdul Rahman Bojeng, Sarawak (MY); Kit Soon Choong, Penang (MY)

(73) Assignee: Motorola Solutions, Inc., Schaumburg, IL (US)

( * ) Notice: Subject to any disclaimer, the term of this patent is extended or adjusted under 35 U.S.C. 154(b) by 544 days.

(21) Appl. No.: 12/337,791

(22) Filed: Dec. 18, 2008

(65) Prior Publication Data
US 2010/0159941 A1    Jun. 24, 2010

(51) Int. Cl.
*H04B 1/38* (2006.01)
(52) U.S. Cl. ............. 455/573; 455/521; 455/456.2; 455/404.1
(58) Field of Classification Search .......... 455/574, 455/572, 521, 519, 518, 456.2, 423, 422.1, 455/404.2, 404.1, 90.1; 320/136; 701/220, 701/221, 300; 340/539.13, 573.1
See application file for complete search history.

(56) References Cited

U.S. PATENT DOCUMENTS

| | | | | |
|---|---|---|---|---|
| 5,352,968 A | * | 10/1994 | Reni et al. ............. | 320/136 |
| 5,799,256 A | | 8/1998 | Pombo | |
| 5,870,685 A | * | 2/1999 | Flynn ............. | 455/573 |
| 2002/0086718 A1 | * | 7/2002 | Bigwood et al. ........ | 455/572 |
| 2006/0172756 A1 | * | 8/2006 | Sharony ............. | 455/519 |
| 2007/0004466 A1 | * | 1/2007 | Haartsen ............. | 455/572 |
| 2007/0037610 A1 | | 2/2007 | Logan | |
| 2007/0238454 A1 | | 10/2007 | Chambers | |
| 2008/0039048 A1 | | 2/2008 | Terri et al. | |
| 2008/0077326 A1 | * | 3/2008 | Funk et al. ............. | 701/220 |
| 2010/0159976 A1 | * | 6/2010 | Marocchi et al. ........ | 455/519 |

FOREIGN PATENT DOCUMENTS

WO    2007035351 A1    3/2007

OTHER PUBLICATIONS

International Search Report for International Application No. PCT/US09/67955 mailed on Aug. 19, 2010.
International Preliminary Report on Patentability for International Application No. PCT/US09/67955 mailed on Jun. 21, 2011.

* cited by examiner

*Primary Examiner* — Kent Chang
*Assistant Examiner* — Nelson Rosario
(74) *Attorney, Agent, or Firm* — Terri Hughes Smith; Barbara R. Doutre

(57) ABSTRACT

A method and apparatus for determining whether a device is suitable for operating at an incidence location enables effective deployment of devices in a wireless communication network. The method includes identifying a location of the device in the wireless communication network. Next, a state of charge of a battery of the device is identified based on data received from the device. A preference value of the device is then determined relative to an incidence location in the wireless communication network. The preference value is a function of the state of charge of the device and a distance between the location of the device and the incidence location. Finally, using the preference value, it is determined whether the device is suitable for operating at the incidence location.

17 Claims, 7 Drawing Sheets

USER ID                              : UNIT01
PREFERENCE VALUE ($F_n$)
    EMERGENCY SITE A                 : 0.91
    EMERGENCY SITE B                 : 0.34
CAPACITY                             : 1100mAh
ESTIMATED REMAINING OPERATING TIME   : 7HRS
DISTANCE
    BASE STATION                     : 1.1KM
    EMERGENCY SITE A                 : 7.5KM
    EMERGENCY SITE B                 : 12.5KM
RATE OF POWER CONSUMPTION            : LOW
EMERGENCY ASSIGNMENT                 : A

METHOD AND APPARATUS FOR DETERMINING WHETHER A DEVICE IS SUITABLE FOR OPERATING AT AN INCIDENCE LOCATION

FIELD OF THE INVENTION

The present invention relates generally to wireless communication devices, and in particular, but not exclusively, to whether a device is suitable for operating at an incidence location based on power parameters of the device.

BACKGROUND

Urban and commercial wireless network channels can be severely affected by fading and interference problems. To overcome these problems, and to achieve desirable system throughputs while supporting mission critical data and voice applications, advanced signal processing techniques are often employed at wireless communication devices. However, those techniques, such as filtering and equalization techniques, can consume significant power resources at a device.

Many organizations, such as law enforcement, firefighting, and military organizations, employ fleets of wireless devices and their associated personnel that must be capable of performing reliably at various incidence locations in a wireless network. Such organizations often direct mission critical responses to an incidence location based on the distance between a present location of a device and the incidence location. However, if other parameters such as the available power of devices and anticipated power requirements of devices are not considered, the devices and their associated personnel may not be able to respond effectively at the incidence location.

There is therefore a need for an improved method and apparatus for determining whether a device is suitable for operating at an incidence location.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
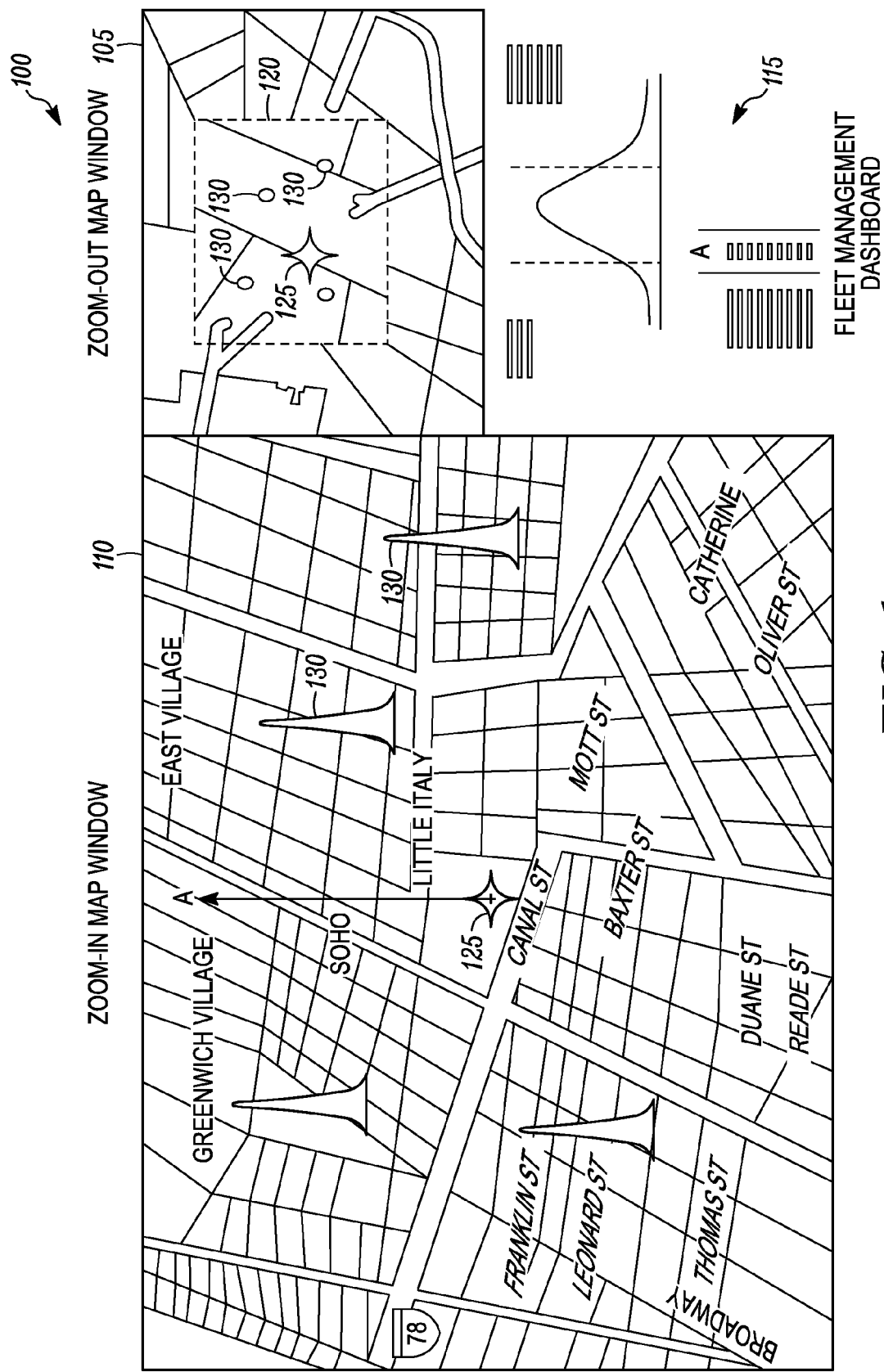
FIG. 1 is a diagram illustrating features of a display of a power monitoring apparatus, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to determining whether a device is suitable for operating at an incidence location. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

According to one aspect, the present invention is a method for determining whether a device is suitable for operating at an incidence location. The method includes identifying a location of the device in a wireless communication network. Next, a state of charge of a battery of the device is identified based on data received from the device. A preference value of the device is then determined relative to an incidence location in the wireless communication network. The preference value is a function of the state of charge of the device and a distance between the location of the device and the incidence location. Finally, using the preference value, it is determined whether the device is suitable for operating at the incidence location.

Some embodiments of the present invention therefore enable a power monitoring apparatus operating at a base station in a wireless communication network to provide to decision makers relevant information about the power requirements and capabilities of devices that are under the control of the base station. For example, organizations such as law enforcement, firefighting, and military organizations that employ fleets of wireless devices and their associated personnel can employ the present invention to more effectively direct response units to particular incidence locations.

Referring to FIG. 1, a diagram illustrates features of a display 100 of a power monitoring apparatus, according to some embodiments of the present invention. The features include a zoom-out map window 105, a zoom-in map window 110, and a fleet management dashboard 115. The zoom-out map window 105 enables a user to select a region of interest on a map. A dotted line 120 defines a particular region of interest that includes an incidence location 125 and the locations 130 of several devices. For example, the power monitoring apparatus may be included in a mobile base station of a fire department, the incidence location 125 may be the location of a fire, and the devices may be two-way radios located in fire fighting response units.

The zoom-in map window 110 illustrates a close-up view of the region of interest defined by the dotted line 120. The location 130 of each device in the zoom-in map window 110 is identified by a parabola that indicates a state of charge of a battery of the respective device operating at that location 130. Further, the fleet management dashboard 115 provides information on a general state of readiness of the devices. Details concerning the fleet management dashboard 115 are provided further below.

A user of the display 100 is thus enabled to quickly assess the relative positions of the incidence location 125 and response units, and acquire a general understanding of the power status of the devices operating at the locations 130. Such knowledge then can be used to more effectively dispatch response units to the incidence location 125.

Figure 2:
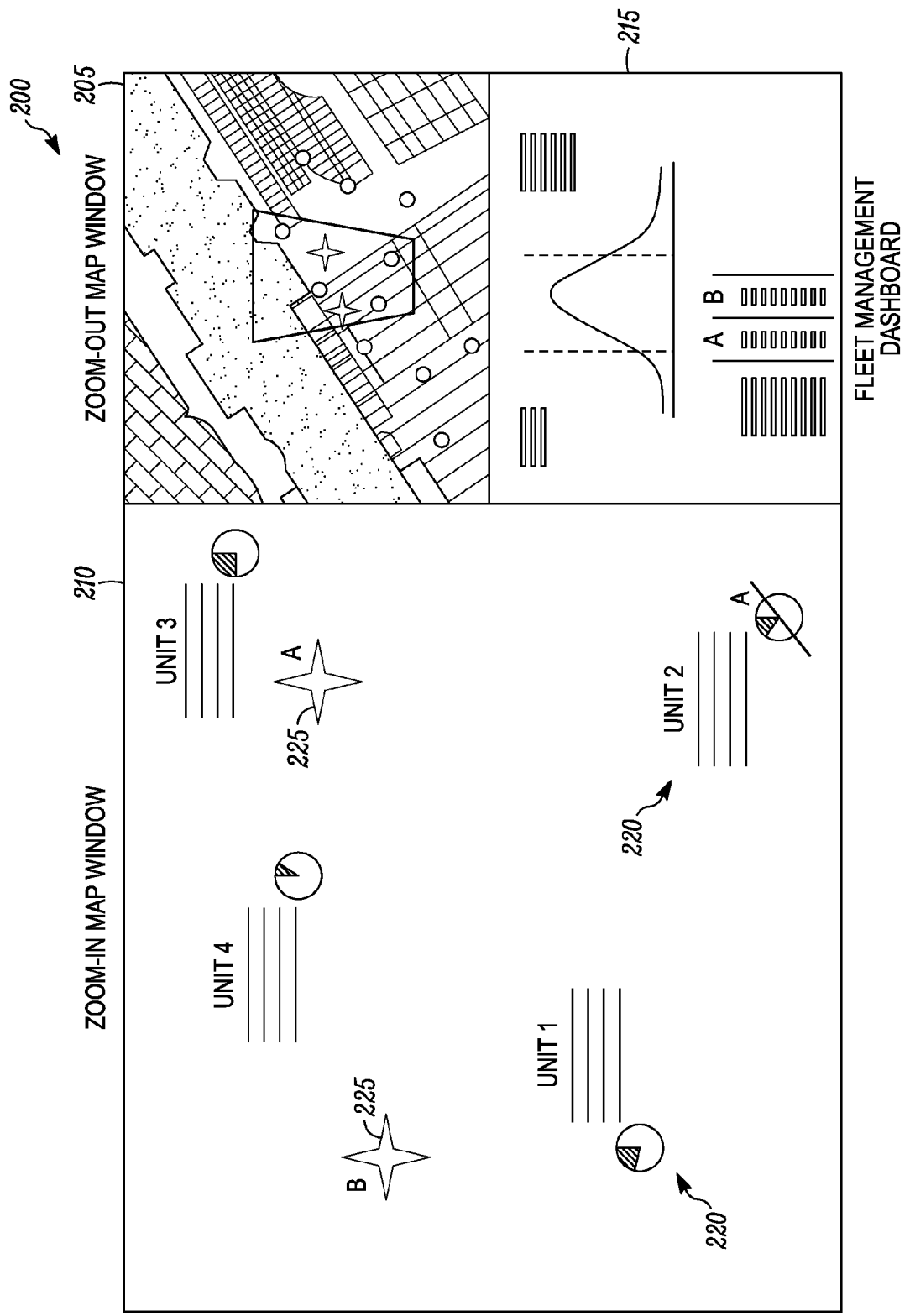
FIG. 2 is a diagram illustrating features of a display of a power monitoring apparatus, according to other embodiments of the present invention.

Referring to FIG. 2, a diagram illustrates features of a display 200 of a power monitoring apparatus, according to other embodiments of the present invention. Similar to the display 100, the features include a zoom-out map window 205, a zoom-in map window 210, and a fleet management dashboard 215. The zoom-in map window 210 includes icons 220 that display various parameters of devices operating at specified locations, and the positions 225 of two incidence locations "A" and "B". Examples of the parameters displayed in the icons 220 are described below.

Figure 3:
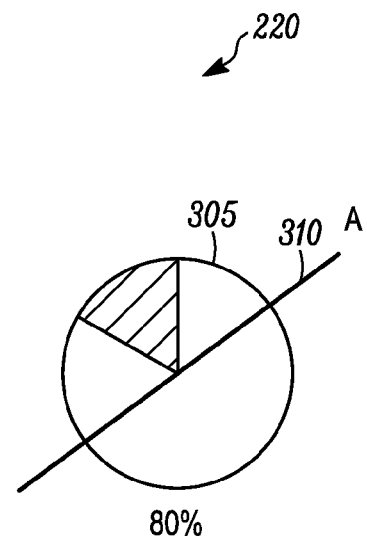
FIG. 3 is a diagram illustrating a close-up view of an icon displayed on a zoom-in map window, according to some embodiments of the present invention.

Referring to FIG. 3, a diagram illustrates a close-up view of an icon 220, as displayed on the zoom-in map window 210. The icon 220 includes a listing of various parameters associated with a particular device. For example, such parameters may include the following: a user identification (ID) that identifies a particular device, preference values ($F_n$) relative to particular incidence locations; a power capacity expressed in milli-ampere hours (mAh); an estimated remaining operation time expressed in hours; distances from other relevant locations expressed in kilometers (km); a relative rate of power consumption; and an identification of an incidence location to which the particular device has been assigned.

The icon 220 of FIG. 3 further includes a pie chart 305 that includes a color coded indication of the state of charge of the device, which is shown as 80 percent. A line 310 marked with the letter "A" then indicates that the device has been assigned to the incidence location A shown on the zoom-in map window 210.

A preference value ($F_n$) is a value that is used to indicate a suitability of a device for operating at an incidence location. A preference value thus can be determined as a function of a number of parameters, including a state of charge of a device and a distance between the location of the device and the incidence location.

For example, a preference value ($F_n$) can be determined as a simple ratio of a state of charge of a device and a distance between the location of the device and the incidence location, as shown in the following equation:

$$F_n = \frac{C(t)}{D(t)} \qquad \text{Eq. 1}$$

where t is time, C(t) is a state of charge of a battery of a device, and D(t) is a distance between the location of the device and the incidence location.

Future values of the preference value can be predicted using the following equation:

$$C(t+\Delta t) = w_c C(t) + n_c \qquad \text{Eq. 2}$$

where $\Delta t$ is an elapsed time period of a prediction interval, $w_C$ is an adapted weight value, and $n_C$ is a noise factor.

The adapted weight value can be determined as a function of various parameters. For example, according to some embodiments of the present invention, the adapted weight value ($w_C$) can be determined according to the following equation:

$$w_C = f(C(t), \text{SoH}, \alpha, L, T, w(r,t), e_C) \qquad \text{Eq. 3}$$

where C(t) is a state of charge of a battery of a device, SoH is a state of health value of the battery of the device, $\alpha$ is a historical usage coefficient of the battery of the device, L is a discharge rate of the battery of the device, T is a temperature of the battery of the device, w(r,t) is a wireless channel model coefficient that is dependent on the device location (r) and the present time (t), and $e_C$ is an error prediction parameter.

As will be understood by those having ordinary skill in the art, the adapted weight value ($w_C$) can be calculated by using commonly applied signal processing algorithms, such as a least mean squares (LMS) algorithm or a recursive least squares (RLS) algorithm. The error prediction parameter ($e_C$) can be calculated using the following equation:

$$e_C = C_p(t) - C(t) \qquad \text{Eq. 4}$$

where $C_p(t)$ is a predicted state of charge value that is fed back into an adaptive signal processing algorithm for determining the adapted weight value ($w_C$).

Similarly, a predicted state of D(t) can be determined by the following equation:

$$D(t+\Delta t) = w_D D(t) + n_D \qquad \text{Eq. 5}$$

where $\Delta t$ is an elapsed time period of a prediction interval, $w_D$ is an adapted weight value, and $n_D$ is a noise factor.

The adapted weight value $w_D$ can be determined as a function of various parameters. For example, according to some embodiments of the present invention, the adapted weight value $w_D$ can be determined according to the following equation:

$$w_D = f(D(t), v, \beta, e_D) \qquad \text{Eq. 6}$$

where v is a present velocity of the device, $\beta$ is a historical device position coefficient, and $e_D$ is an error prediction parameter.

As will be understood by those having ordinary skill in the art, the adapted weight value ($w_D$) also can be calculated by using commonly applied signal processing algorithms, such as a least mean squares (LMS) algorithm or a recursive least squares (RLS) algorithm. The error prediction parameter ($e_D$) can be calculated using the following equation:

$$e_D = D_p(t) - D(t) \qquad \text{Eq. 7}$$

where $D_p(t)$ is a predicted distance value that is fed back into an adaptive signal processing algorithm for determining the adapted weight value ($w_D$).

Figure 4:
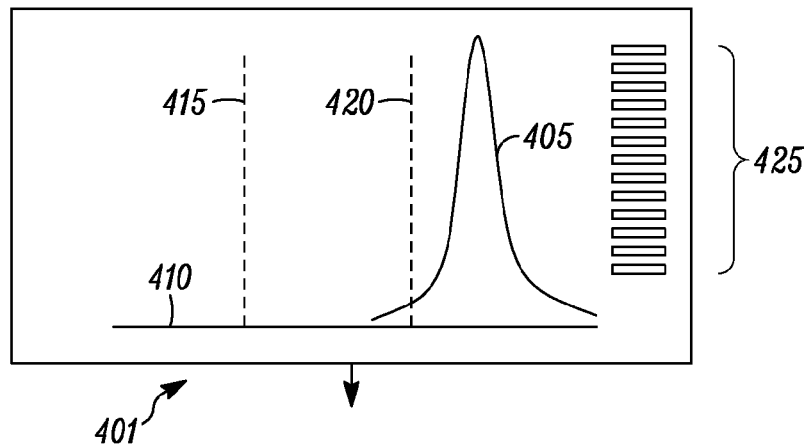
FIG. 4 shows three diagrams illustrating histogram features of a fleet management dashboard, according to some embodiments of the present invention.
Figure 4:
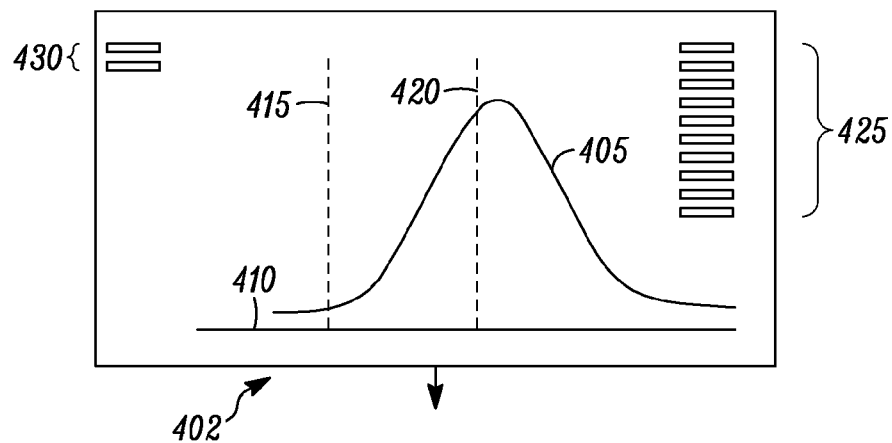
Figure 4:
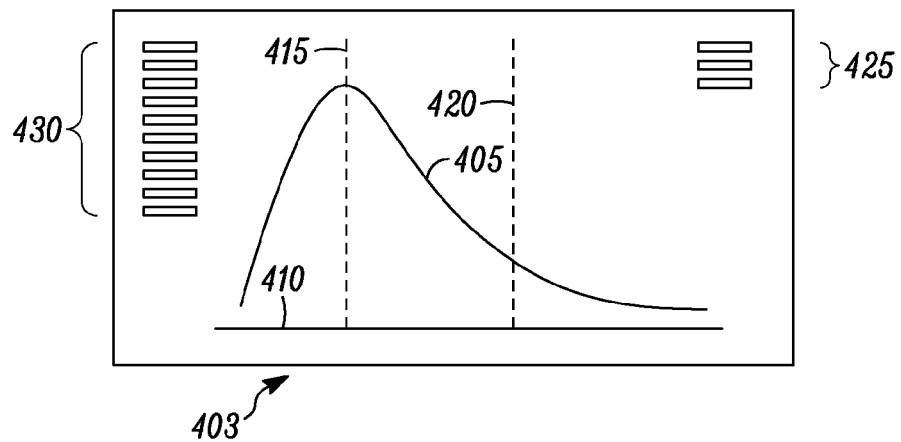

Referring to FIG. 4, three diagrams 401, 402, 403 illustrate histogram features of a fleet management dashboard, such as the fleet management dashboard 115 or 215. The histogram features include a histogram curve 405 that represents a statistical indication of a plurality of preference values ($F_n$) associated with a fleet of devices that is being monitored at a power monitoring apparatus. Thus, a horizontal axis 410 of each histogram curve 405 represents preference values ($F_n$), and a vertical axis of each histogram curve 405 represents a number of devices operating at a particular preference value ($F_n$). A lower threshold line 415 and an upper threshold line 420 indicate an acceptable operating range of preference values ($F_n$). A list 425 identifies devices that have a preference value ($F_n$) above the lower threshold line 415, and a list 430 identifies devices that have a preference value ($F_n$) below the lower threshold line 415. The preference values ($F_n$) are thus used to generate a histogram for determining whether a device is suitable for operating at an incidence location.

The diagram 401 may indicate a fleet at a beginning of an operation deployment, where all devices being monitored by the power monitoring apparatus have a preference value ($F_n$) above the lower threshold line 415. The diagram 402 may indicate a fleet during normal operation deployment, where a majority of devices being monitored by the power monitoring apparatus have a preference value ($F_n$) above the lower threshold line 415. Finally, the diagram 403 may indicate a power exhausted fleet near the end of an operation deployment, where many devices being monitored by the power monitoring apparatus have a preference value ($F_n$) below the lower threshold line 415.

Because the preference values ($F_n$) can be determined at a remote power monitoring apparatus, individual devices are not required to drain their own battery power to make calculations related to power management. A power monitoring apparatus can then transmit power-related information to a device, such as information concerning an area having poor channel conditions or which otherwise requires a high power drain, or information concerning a nearest battery charging station. Also, a power monitoring apparatus can correlate device data with other location dependent information, such as weather forecasts and traffic conditions, to generate more precise battery usage predictions and charging opportunities.

Figure 5:
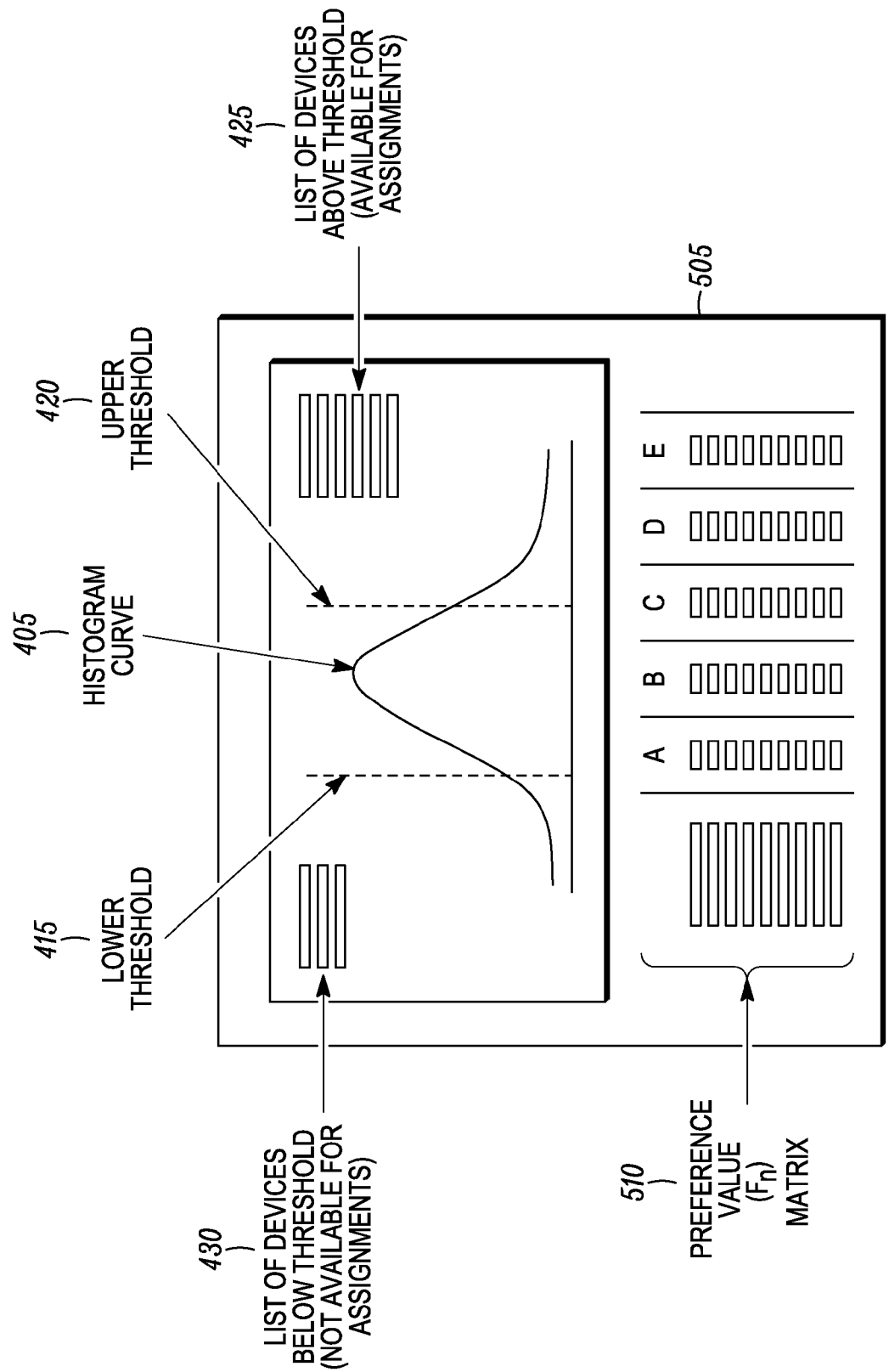
FIG. 5 is a diagram further illustrating histogram features of a fleet management dashboard, according to some embodiments of the present invention.

Referring to FIG. 5, a diagram 505 further illustrates histogram features of a fleet management dashboard, such as the fleet management dashboard 115 or 215. The diagram 505 includes a preference value ($F_n$) matrix 510, as described in more detail below.

Figure 6:
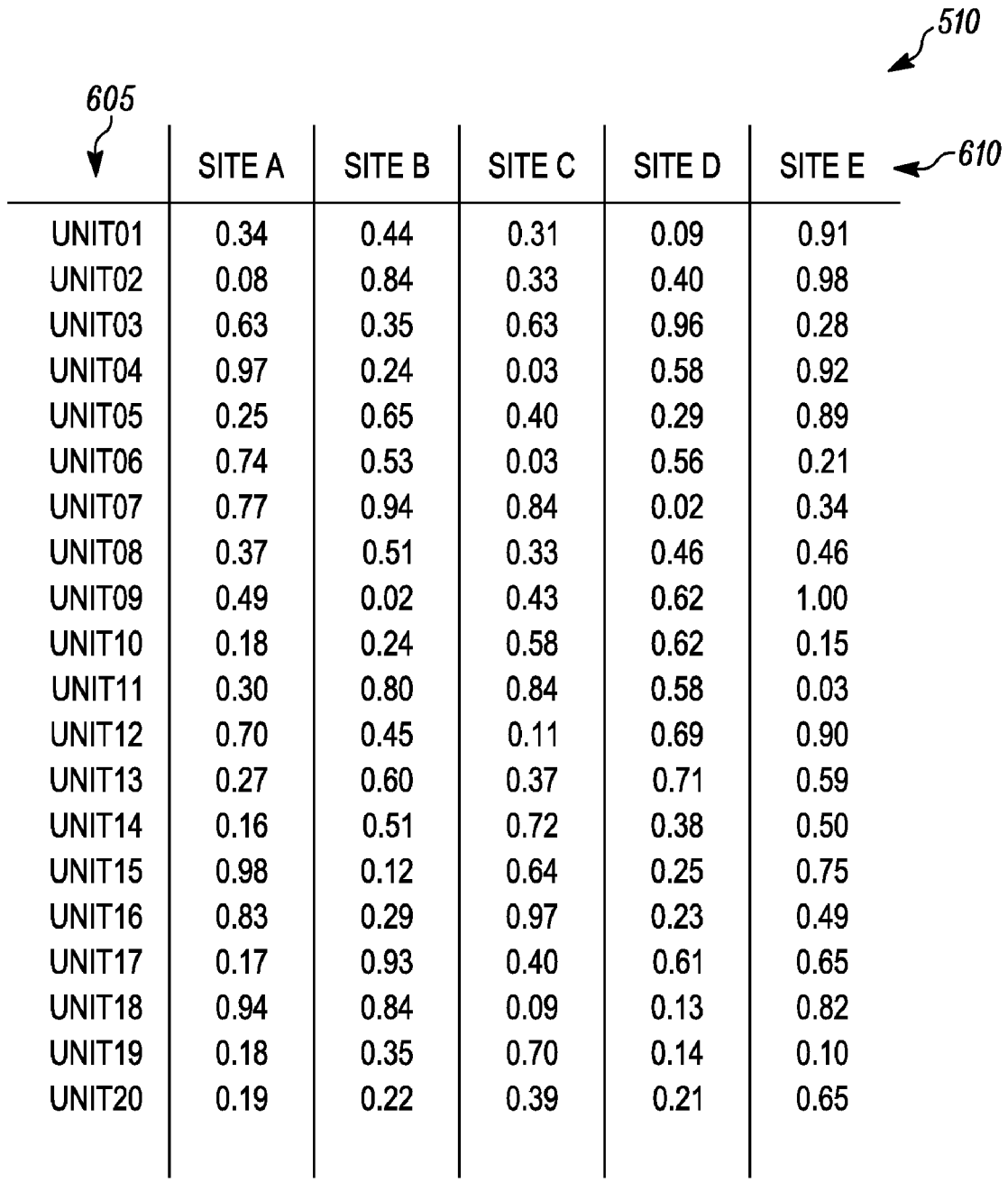
FIG. 6 is an example of a preference value ($F_n$) matrix, according to some embodiments of the present invention.

Referring to FIG. 6, an example of the preference value ($F_n$) matrix 510 is shown in detail. Twenty devices being monitored by the power monitoring apparatus are identified in column 605 as "Unit01" to "Unit20". Row 610 then identifies five incidence locations as "Site A" to "Site E". A preference value ($F_n$) is then identified for each device relative to each incidence location. According to some embodiments of the present invention, the preference values ($F_n$) in the matrix 510 can be color coded. For example, preference values ($F_n$) that fall below a lower threshold may be displayed in red, to indicate that the corresponding device should not be deployed to the corresponding incidence location. Similarly, preference values ($F_n$) that are above an upper threshold may be displayed in green, to indicate that the corresponding device is a strong candidate for deployment to the corresponding incidence location.

Figure 7:
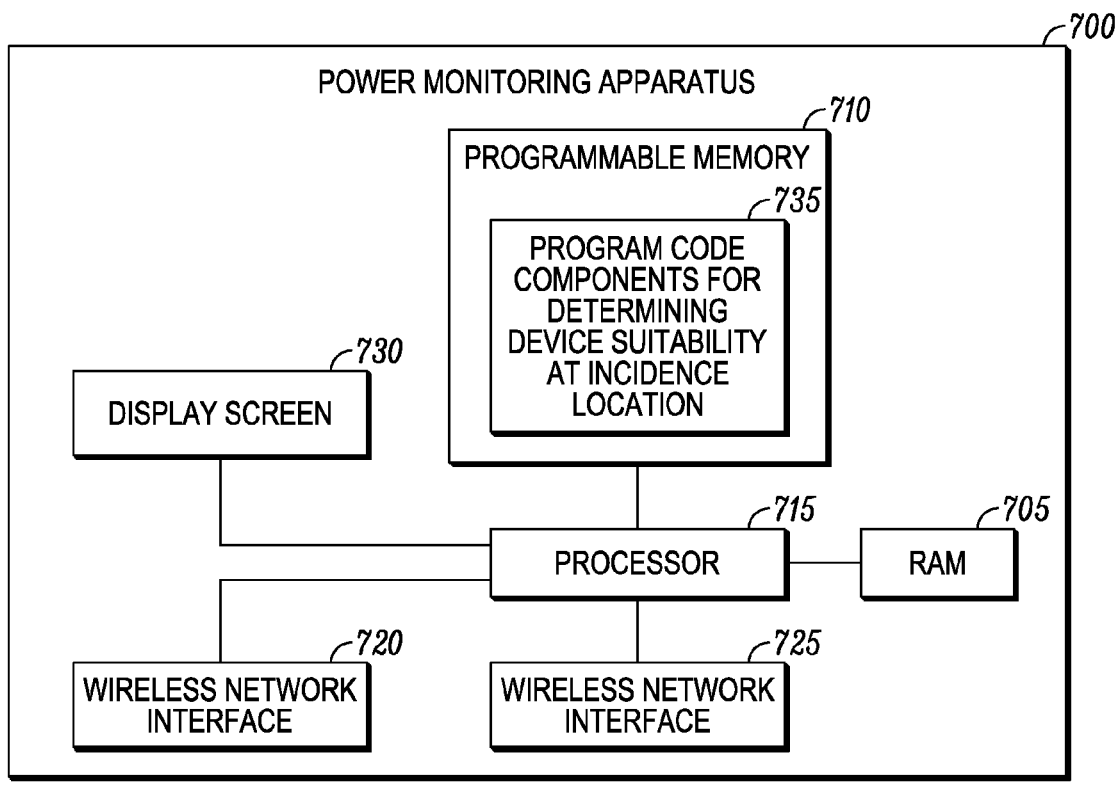
FIG. 7 is a block diagram illustrating components of a power monitoring apparatus, according to some embodiments of the present invention.

Referring to FIG. 7, a block diagram illustrates components of a power monitoring apparatus 700, according to some embodiments of the present invention. The power monitoring apparatus 700, for example, can be an integrated unit containing at least all the elements depicted in FIG. 7, as well as any other elements necessary for the power monitoring apparatus 700 to perform its particular functions. Alternatively, the power monitoring apparatus 700 can comprise a collection of appropriately interconnected units or devices, wherein such units or devices perform functions that are equivalent to the functions performed by the elements depicted in FIG. 7.

The power monitoring apparatus 700 comprises a random access memory (RAM) 705 and a programmable memory 710 that are coupled to a processor 715. The processor 715 also has ports for coupling to wireless network interfaces 720, 725. The wireless network interfaces 720, 725 can be used to enable the power monitoring apparatus 700 to communicate with other devices in a wireless communication network. For example, the power monitoring apparatus 700 can communicate with the device indicated as "Unit 2" in the zoom-in map window 210 shown in FIG. 2 using the wireless network interface 720 to receive and route data packets. A display screen 730 is also operatively connected to the processor 715 and can include, for example, the display 100 or the display 200.

The programmable memory 710 can store operating code (OC) for the processor 715 and code for performing functions associated with a power requirement monitoring apparatus. For example, the programmable memory 710 can store various parameters associated with devices being monitored, and can also store computer readable program code components 735 configured to cause execution of a method for determining whether a device is suitable for operating at an incidence location as described herein.

Figure 8:
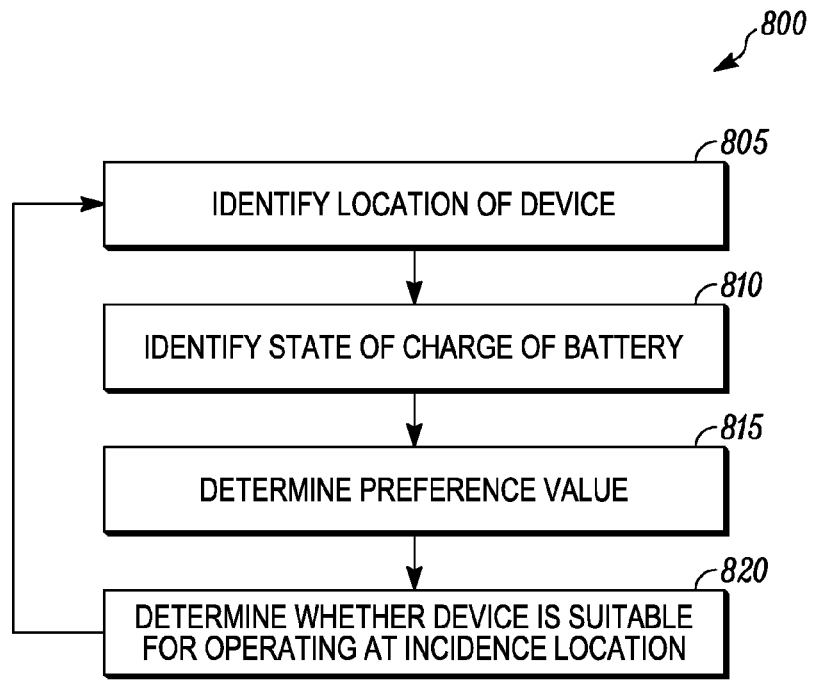
FIG. 8 is a general flow diagram illustrating a method for determining whether a device is suitable for operating at an incidence location, according to some embodiments of the present invention.

Referring to FIG. 8, a general flow diagram illustrates a method for determining whether a device is suitable for operating at an incidence location, according to some embodiments of the present invention. At step 805, a location of the device in a wireless communication network is identified. For example, a present location of the device indicated on the zoom-in map window 210 as "Unit 2" may be identified at a power monitoring apparatus from a signal transmitted from the device. As known by those having ordinary skill in the art, various locating technologies can be used, such as global positioning system (GPS) technologies, assisted GPS technologies, various signal triangulation technologies, and a simple reporting of position coordinates by a device.

At step 810, a state of charge of a battery of the device is identified based on data received from the device. For example, the device indicated on the zoom-in map window 210 as "Unit 2" may transmit to a power monitoring apparatus a state of charge of a battery of the device expressed in a form such as a percentage or in units such as milli-ampere hours (mAh).

At step 815, a preference value of the device is determined relative to an incidence location in the wireless communication network, wherein the preference value is a function of the state of charge of the device and a distance between the location of the device and the incidence location. For example, a preference value ($F_n$) can be determined using the Equations 1-7 defined above.

At step 820, it is determined, using the preference value, whether the device is suitable for operating at the incidence location. For example, the processor 715 of the power monitoring apparatus 700 can automatically determine that the preference value is below a lower threshold value. The power monitoring apparatus 700 can then display the preference value using appropriate indications on a fleet management dashboard, such as the fleet management dashboard 215. The method 800 then can be repeated for each of a plurality of devices operating in the wireless communication network.

Advantages of the present invention thus include enabling a power monitoring apparatus, which for example operates at a base station in a wireless communication network, to provide to decision makers relevant information about the power requirements and capabilities of devices that are under the control of the base station. Such decision makers are then able to more effectively assess whether a device is suitable for operating at an incidence location. Other advantages include enabling more effective scheduling of battery charging and reconditioning by battery powered device fleet operators.

It will be appreciated that embodiments of the invention described herein may be comprised of one or more conventional processors and unique stored program instructions that control the one or more processors to implement, in conjunction with certain non-processor circuits, some, most, or all of the functions of determining whether a device is suitable for operating at an incidence location as described herein. The non-processor circuits may include, but are not limited to, a radio receiver, a radio transmitter, signal drivers, clock circuits, power source circuits, and user input devices. As such, these functions may be interpreted as steps of a method for determining whether a device is suitable for operating at an incidence location. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for determining whether a device is suitable for operating at an incidence location, the method comprising:
   identifying, by a power monitoring apparatus operating in a wireless communication network, a location of the device in the wireless communication network, wherein the device is associated with a response unit;
   identifying, by the power monitoring apparatus, a state of charge of a battery of the device based on data received from the device;
   determining, by the power monitoring apparatus, a preference value of the device relative to an incidence location in the wireless communication network, wherein the preference value is a function of the state of charge of the device and a distance between the location of the device and the incidence location;
   determining, by the power monitoring apparatus, using the preference value, whether the device is suitable for operating at the incidence location; and
   dispatching, by the power monitoring apparatus, the response unit from the location of the device to the incidence location based on the determination that the device is suitable for operating at the incidence location.

2. The method of claim 1, wherein the method is repeated for each of a plurality of devices operating in the wireless communication network.

3. The method of claim 1, wherein the preference value is displayed on the power monitoring apparatus.

4. The method of claim 1, wherein the preference value is displayed on a histogram curve on the power monitoring apparatus.

5. The method of claim 1, wherein the preference value is used to generate a histogram for determining whether the device is suitable for operating at the incidence location.

6. The method of claim 1, wherein the preference value is a ratio of the state of charge of the device and the distance between the location of the device and the incidence location.

7. The method of claim 1, wherein the preference value is also a function of an adapted weight value.

8. The method of claim 7, wherein the adapted weight value is a function of parameters selected from the following: a state of health coefficient of the battery of the device, a historical usage coefficient of the battery of the device, a discharge rate of the battery of the device, a temperature of the battery of the device, a wireless channel model coefficient, and an error prediction parameter.

9. The method of claim 7, wherein the adapted weight value is determined using a least mean squares algorithm or a recursive least squares algorithm.

10. A power monitoring apparatus for determining whether a device is suitable for operating at an incidence location, the apparatus comprising:
    computer readable program code components for identifying a location of the device in a wireless communication network, wherein the device is associated with a response unit;
    computer readable program code components for identifying a state of charge of a battery of the device based on data received from the device;
    computer readable program code components for determining a preference value of the device relative to an incidence location in the wireless communication network, wherein the preference value is a function of the state of charge of the device and a distance between the location of the device and the incidence location;
    computer readable program code components for determining, using the preference value, whether the device is suitable for operating at the incidence location; and
    computer readable program code components for dispatching the response unit from the location of the device to the incidence location based on the determination that the device is suitable for operating at the incidence location.

11. The apparatus of claim 10, wherein the preference value is displayed on a display screen of the apparatus.

12. The apparatus of claim 11, wherein the preference value is displayed on a histogram curve on the display screen of the apparatus.

13. The apparatus of claim 10, wherein the preference value is used to generate a histogram for determining whether the device is suitable for operating at the incidence location.

14. The apparatus of claim 10, wherein the preference value is a ratio of the state of charge of the device and the distance between the location of the device and the incidence location.

15. The apparatus of claim 10, wherein the preference value is also a function of an adapted weight value.

16. The apparatus of claim 15, wherein the adapted weight value is a function of parameters selected from the following: a state of health coefficient of the battery of the device, a historical usage coefficient of the battery of the device, a discharge rate of the battery of the device, a temperature of the battery of the device, a wireless channel model coefficient, and an error prediction parameter.

17. The apparatus of claim 15, wherein the adapted weight value is determined using a least mean squares algorithm or a recursive least squares algorithm.

* * * * *